United States Patent [19]

Izawa et al.

[11] Patent Number: 5,459,525
[45] Date of Patent: Oct. 17, 1995

[54] VIDEO SIGNAL CONVERTING DEVICE AND NOISE ELIMINATOR USED THEREIN

[75] Inventors: Yosuke Izawa, Ibaraki; Naoji Okumura, Minou, both of Japan

[73] Assignee: Matsushita Electric Industrial Co, Ltd., Kadoma, Japan

[21] Appl. No.: 103,456

[22] Filed: Aug. 6, 1993

[30] Foreign Application Priority Data

Aug. 6, 1992 [JP] Japan .................................. 4-233077
Aug. 28, 1992 [JP] Japan .................................. 4-229618

[51] Int. Cl.$^6$ ............................ H04N 7/01; H04N 11/20
[52] U.S. Cl. ............................ 348/553; 348/441; 348/561; 348/443
[58] Field of Search ................................ 358/140, 141, 358/11, 12, 180; 348/553, 561, 578, 451, 443, 699, 455, 441; H04N 7/01, 11/20

[56] References Cited

U.S. PATENT DOCUMENTS

| | | | |
|---|---|---|---|
| 4,841,366 | 6/1989 | Katagiri et al. | 358/167 |
| 4,845,562 | 7/1989 | Koslov et al. | 358/141 |
| 4,891,701 | 1/1990 | Shikina et al. | 358/11 |
| 5,047,857 | 9/1991 | Duffield et al. | 358/180 |
| 5,237,396 | 8/1993 | Kayashima et al. | 358/11 |
| 5,243,421 | 9/1993 | Nagata et al. | 358/140 |

FOREIGN PATENT DOCUMENTS

| | | | |
|---|---|---|---|
| 287174 | 4/1988 | European Pat. Off. | H04N 11/08 |
| 460908 | 6/1991 | European Pat. Off. | H04N 9/262 |
| 3-42980 | 2/1991 | Japan . | |
| 2212360 | 11/1987 | United Kingdom | H04N 9/74 |

*Primary Examiner*—James J. Groody
*Assistant Examiner*—Glenton B. Burgess
*Attorney, Agent, or Firm*—Ratner & Prestia

[57] ABSTRACT

An apparatus for converting an input video signal to a modified video signal comprises a memory for storing data corresponding to the input video signal, an address signal generating device for reading data from the memory and an interpolating filter for interpolating the data read from the memory to obtain a modified video signal. The data are stored and read from the memory using a clock having a predetermined frequency. However, since the number of addresses being read in one horizontal display varies with the conversion rate of video signals, the length of one horizontal display of the modified video signal is different from that of the input video signal.

6 Claims, 12 Drawing Sheets

| | | | | | | | | | | | |
|---|---|---|---|---|---|---|---|---|---|---|---|
| INPUT SIGNAL | | X | 0 X 10 X 20 X 30 X 40 X 50 X 60 X 70 X 80 X --- | | | | | | | | |
| | ADDRESS | | 0 | 1 | 2 | 3 | 4 | 5 | 6 | 7 | 8 |
| LINE MEMORY | DATA | | 0 | 10 | 20 | 30 | 40 | 50 | 60 | 70 | 80 --- |

COUNTER OUTPUT X 0 X 1 X 2 X 3 X 4 X 5 X 6 X 7 X 8 X ---

CONSTANT VALUE X       1/3      ---

MULTIPLIER 5 OUTPUT
- INTEGER PART: X 0 X 0 X 0 X 1 X 1 X 1 X 2 X 2 X 2 X ---
- DECIMAL PART: X 0 X $\frac{1}{3}$ X $\frac{2}{3}$ X 0 X $\frac{1}{3}$ X $\frac{2}{3}$ X 0 X $\frac{1}{3}$ X $\frac{2}{3}$ X ---

READING ADDRESS An  X 0 X 1 X 2 X 4 X 5 X 6 X 8 X 9 X 10 X ---

READING DATA Dn  X 0 X 10 X 20 X 40 X 50 X 60 X 80 X 90 X 100 X ---

Dn + 1  X 10 X 20 X 30 X 50 X 60 X 70 X 90 X 100 X 110 X ---

SUBTRACTOR 7 OUTPUT  X 10 X 10 X 10 X 10 X 10 X 10 X 10 X 10 X 10 X ---

MULTIPLIER 8 OUTPUT  X 0 X $\frac{10}{3}$ X $\frac{20}{3}$ X 0 X $\frac{10}{3}$ X $\frac{20}{3}$ X 0 X $\frac{10}{3}$ X $\frac{20}{3}$ X ---

OUTPUT SIGNAL  X 0 X $13\frac{1}{3}$ X $26\frac{2}{3}$ X 40 X $53\frac{1}{3}$ X $66\frac{2}{3}$ X 80 X $93\frac{1}{3}$ X $106\frac{2}{3}$ X ---

FIG. 2

| | | | | | | | | | | |
|---|---|---|---|---|---|---|---|---|---|---|
| INPUT SIGNAL | | ✕0✕10✕20✕30✕40✕50✕60✕70✕80✕--- | | | | | | | | |
| ADDRESS | | 0 | 1 | 2 | 3 | 4 | 5 | 6 | 7 | 8 |
| LINE MEMORY DATA | | 0 | 10 | 20 | 30 | 40 | 50 | 60 | 70 | 80 |--- |

COUNTER OUTPUT ✕0✕1✕2✕3✕4✕5✕6✕7✕8✕---

CONSTANT VALUE ✕ 4/5 ---

MULTIPLIER 5 OUTPUT
- INTEGER PART ✕0✕0✕1✕2✕3✕4✕4✕5✕6✕---
- DECIMAL PART ✕0✕4/5✕3/5✕2/5✕1/5✕0✕4/5✕3/5✕2/5✕---

SECOND CONSTANT VALUE ✕ 0 ---

READING ADDRESS An ✕0✕0✕1✕2✕3✕4✕4✕5✕6✕---

READING DATA Dn ✕0✕0✕10✕20✕30✕40✕40✕50✕60✕---

Dn+1 ✕10✕10✕20✕30✕40✕50✕50✕60✕70✕---

SUBTRACTOR 7 OUTPUT ✕10✕10✕10✕10✕10✕10✕10✕10✕10✕---

MULTIPLIER 8 OUTPUT ✕0✕8✕6✕4✕2✕0✕8✕6✕4✕---

OUTPUT SIGNAL ✕0✕8✕16✕24✕32✕40✕48✕56✕64✕---

FIG. 5

| | | | | | | |
|---|---|---|---|---|---|---|
| (1) e = (n) | 0 | 1 | 2 | 3 | 4 | 5 |
| (2) f | 0 | 0 | 0 | 1 | 1 | 1 |
| (3) g | 0 | 1/3 | 2/3 | 0 | 1/3 | 2/3 |
| (4) A1 (n) | 0 | 1 | 2 | 0 | 1 | 2 |
| (5) A2 (n) | 1 | 2 | 3 | 4 | 5 | 6 |
| (6) D1 (n) | 0 | 10 | 20 | 40 | 50 | 60 |
| (7) D2 (n) | 10 | 20 | 30 | 50 | 60 | 70 |
| (8) h | 10 | 10 | 10 | 10 | 10 | 10 |
| (9) i | 0 | 10/3 | 20/3 | 0 | 10/3 | 20/3 |
| (10) j | 0 | 13 1/3 | 26 2/3 | 40 | 53 1/3 | 76 2/3 |

|     | (1) | (2) | (3) | (4) | (5) | (6) | (7) | (8) | (9) | (10) |
|-----|-----|-----|-----|-----|-----|-----|-----|-----|-----|------|
|     | 6   | 2   | 0   | 8   | 9   | 80  | 90  | 10  | 0   | 80   |
|     | 7   | 2   | 1/3 | 9   | 10  | 90  | 100 | 10  | 10/3 | 96 1/3 |
|     | 8   | 2   | 2/3 | 10  | 11  | 100 | 110 | 10  | 20/3 | 106 2/3 |
|     | 9   | 3   | 0   | 12  | 13  | 120 | 130 | 10  | 0   | 120  |
|     | 10  | 3   | 1/3 | 13  | 14  | 130 | 140 | 10  | 10/3 | 133 1/3 |
|     | 11  | 3   | 2/3 | 14  | 15  | 140 | 150 | 10  | 20/3 | 146 2/3 |
|     | 12  | 4   | 0   | 16  | 17  | 160 | 170 | 10  | 0   | 160  |

VIDEO SIGNAL CONVERTING DEVICE AND NOISE ELIMINATOR USED THEREIN

FIELD OF THE INVENTION

The present invention relates to a video signal converting device for changing the length of the horizontal display of an input video signal according to the aspect ratio of the display.

The invention further relates to a noise eliminator which operates in conjunction with this video signal converting device.

BACKGROUND OF THE INVENTION

One of the trends of development of television receivers is for larger size and higher image quality. More recently, a display device with an aspect ratio of 16:9 such as a Hi-Vision television set has come to be in a practical stage. When a television signal with a conventional aspect ratio of 4:3 as represented by the NTSC system is shown in a display device having an aspect ratio 16:9, a round image is deformed into a wide ellipse. Therefore, to depict the image correctly, a video signal converting device for converting the length of the horizontal display of the video signal is desirable. To satisfy the need for higher image quality, a noise eliminator for making the image clear is equally important.

An example of an ordinary video signal converting device is as follows. That is, the video signal data is stored synchronized with the write address signal, and the stored address is read out synchronized with the read address signal. In this device, if the frequency is different between the read address signal and write address signal, the length of the horizontal display of the video signal can be changed. This method, however, requires clocks having different frequencies, and the constitution of the device is complicated. However, interference is likely to occur between clocks. Eliminating this interference is difficult.

SUMMARY OF THE INVENTION

A video signal converting device comprises a memory for storing data of input video signal, means for reading out plural addresses specified by the conversion rate of the video signal and the next addresses of the memory (hereinafter called address signal generating device), and means for interpolating and calculating these video signal data values being read out to obtain converted video signals (hereinafter called interpolating filter). The video signal data are stored and read out by using a clock having a specific frequency. However, since the number of addresses being read in one horizontal display varies with the conversion rate of video signals, the length of one or more horizontal display of the converted video signals is different from that of the input video signals.

Further constitution and effects of the invention will be better understood and appreciated from the following detailed description of the preferred embodiments taken in conjunction with the drawings.

BRIEF DESCRIPTION OF THE DRAWINGS

FIG. 2 is a timing chart for explaining the operation of the embodiment in FIG. 1.

FIG. 5 is a timing chart for explaining the operation of the embodiment in FIG. 4.

FIG. 10 is a timing chart (1) for explaining the operation of the embodiment in FIG. 7.

FIG. 11 is a timing chart (2) for explaining the operation of the embodiment in FIG. 7.

DESCRIPTION OF THE PREFERRED EMBODIMENTS

Figure 1:
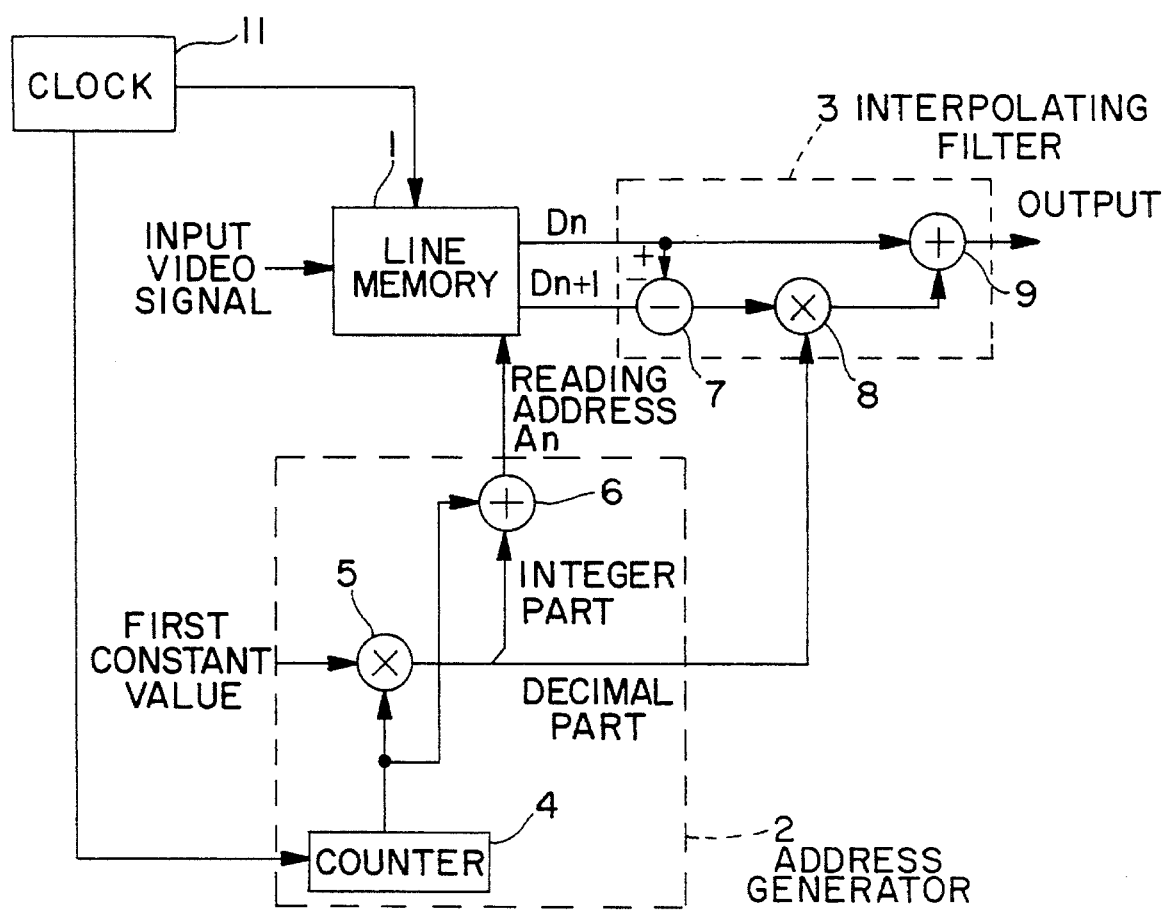
FIG. 1 is a circuit diagram of a video signal converting device according to an exemplary embodiment of the invention.

FIG. 1 shows a circuit diagram of a video signal converting device in an exemplary embodiment of the present invention. In FIG. 1, a line memory 1 stores input signal data sequentially from address 0 using a clock 11 of a predetermined frequency. When reading from line memory 1, if the input address is An, then both data Dn corresponding to An and data Dn+1 corresponding to the next address An+1 are read out. A counter 4 counts the number of horizontal sampling pulses of video signals stored in the line memory 1 from zero at every increment of 1 using clock 11. A multiplier 5 multiplies a given first constant value and the output value of the counter 4. An adder 6 adds the integer part of the output of the multiplier 5 and the output of the counter 4, and the addition output is used in-specifying the reading address of the line memory 1. A subtractor 7 subtracts Dn+1 from the output Dn of the line memory 1. A multiplier 8 multiplies the output of subtractor 7 and the decimal part of the output of the multiplier 5. An adder 9 adds the output Dn of the line memory D1 and the output of the multiplier 8, and obtains an output signal.

Figure 3A:
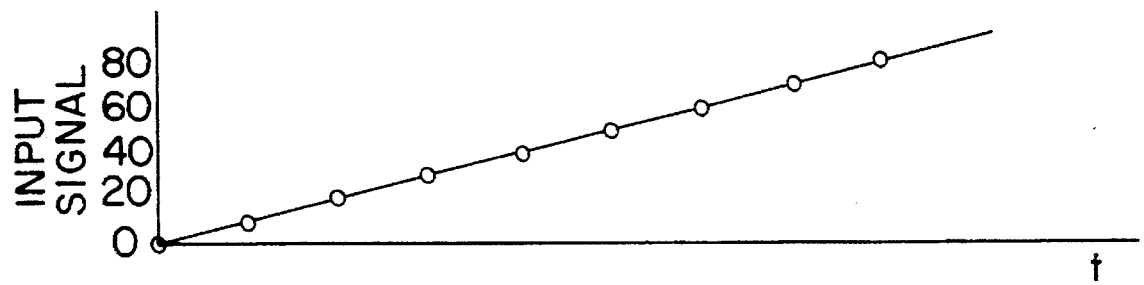
FIG. 3 is a graph showing the relation of input signal and output signal in the embodiment in FIG. 1.
Figure 3B:
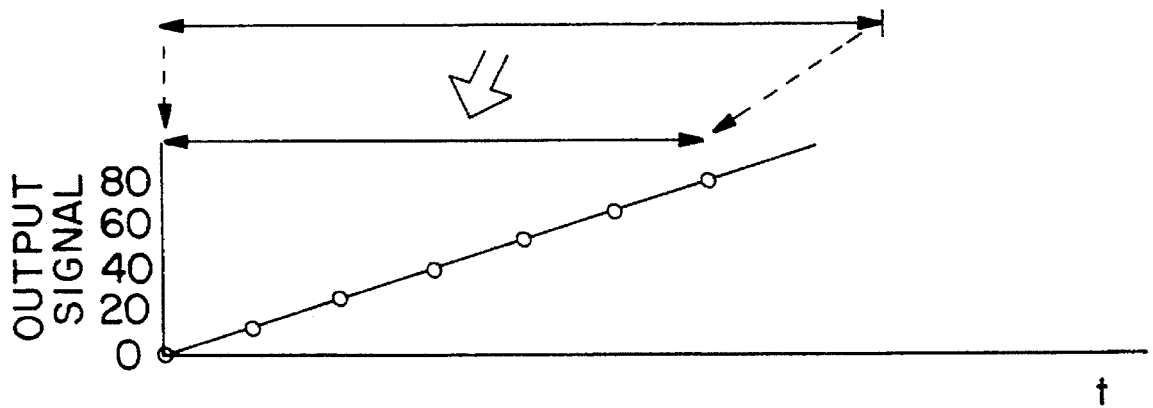

The circuit in FIG. 1 operates as follows (see FIG. 2). In the following explanation, for the sake of simplicity, the first constant value is assumed to be ⅓. First, input signals are stored in the line memory 1 sequentially from address 0 using clock 11. The output value of the counter 4 (obtained by counting one by one from 0) and the constant value are multiplied by the multiplier 5, and the multiplication output is produced. This multiplication output is divided into an integer part and a decimal part. The integer part is added to the output of the counter 4 by the adder 6, and this addition output is used in specifying the reading address of the line memory 1. Two sets of data Dn and Dn+1 in the specified address An and the next address An+1 are read out, and are transmitted to the subtractor 7. The difference between the two sets of data values received by the subtractor 7 is transmitted to the multiplier 8. The multiplier 8 multiplies this difference and the decimal part of the output of the multiplier 5. The adder 9 adds the output of the multiplier 8 and the data Dn read out from the line memory 1. As a result, a compressed video signal is obtained as shown in FIG. 3. Thus, by interpolating the data being read out from the line memory 1, compression of the video signal is achieved by using only one clock.

In an exemplary embodiment of the present invention, a first constant value of ⅓ may be used. However, any arbitrary value from 0 to 1 may be used. The conversion rate of the input video signal is given as $1/(x+1)$ where x is the first constant value.

Figure 4:
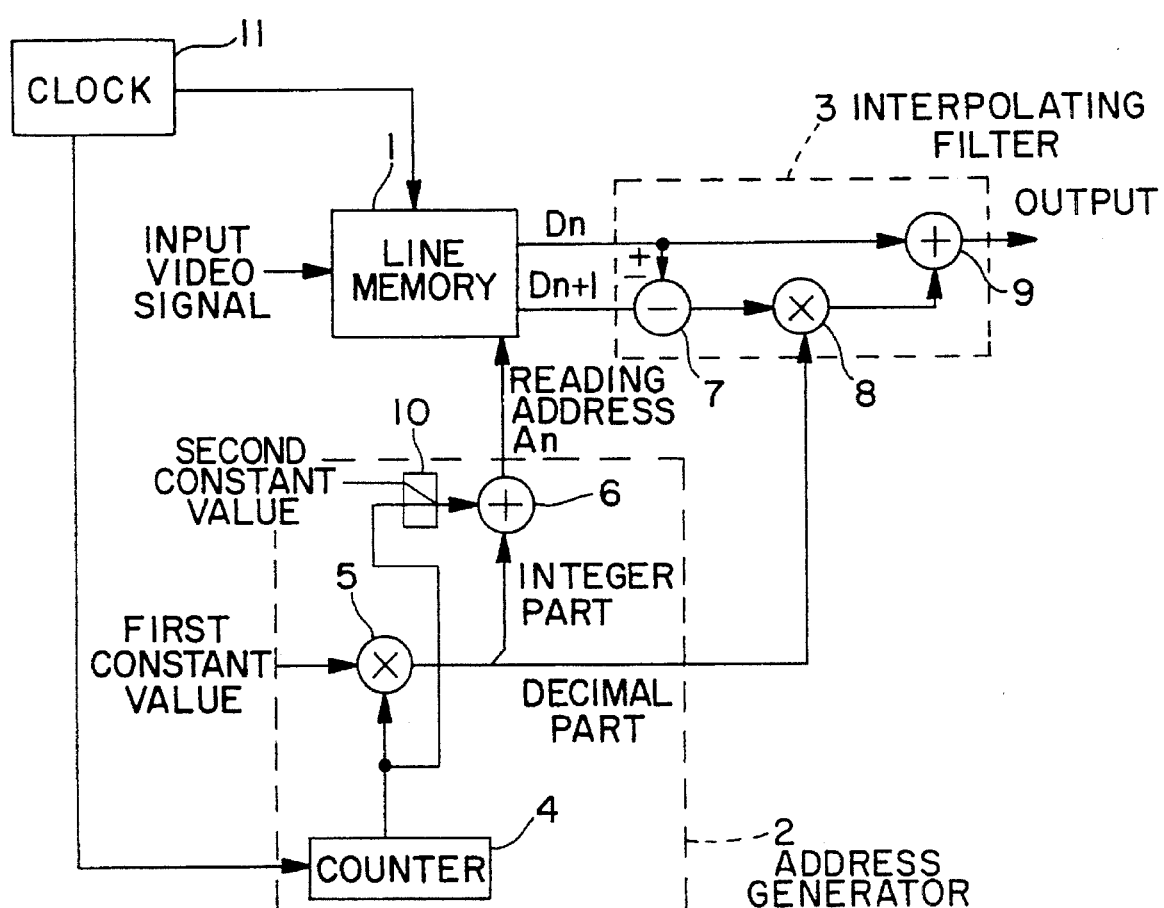
FIG. 4 is a circuit diagram of a second exemplary embodiment of the present invention.
Figure 6A:
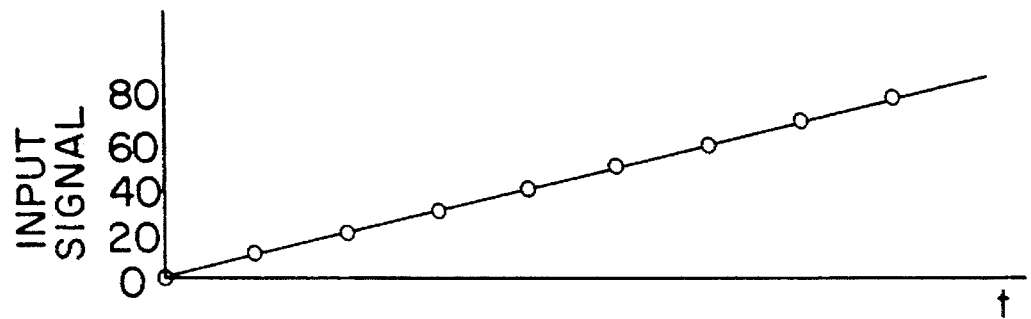
FIGS. 6(a) and (b) are graphs showing the relation between input signal and output signal in the embodiment in FIG. 4.
Figure 6B:
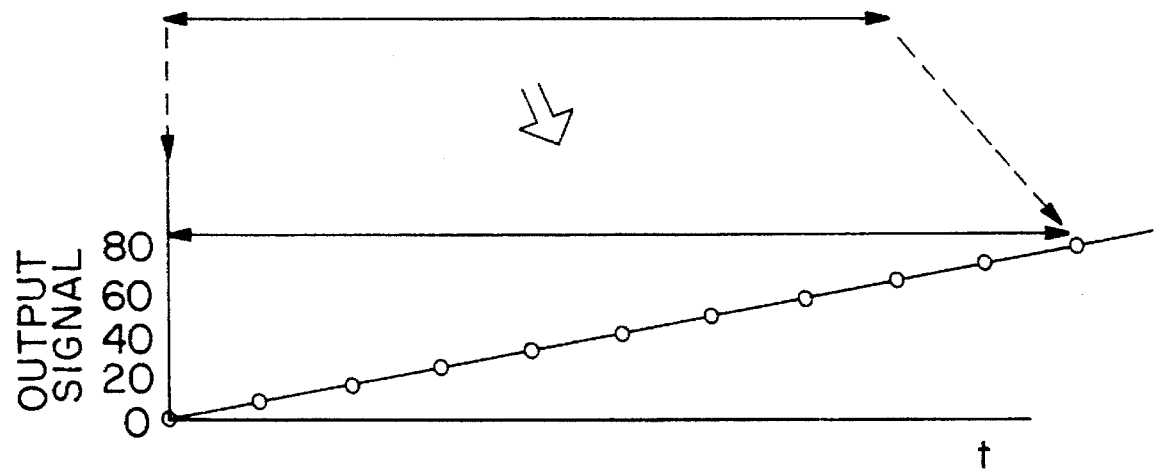

FIG. 4 relates to a second exemplary embodiment of the invention. One difference between the embodiment shown in FIG. 1 and the second embodiment shown in FIG. 4 is that a switch circuit 10 is provided, allowing selection of either the output of the counter 4 or the second constant value. One difference from the operation in the first embodiment is the case when the second constant value is selected by the switch circuit 10. FIG. 5 shows the operation in such a state. The first constant value is ⅘ and the second constant value is 0. One difference from the first embodiment in FIG. 2 is that the integer part of the output of the multiplier 5 directly specifies the reading address. By reading out the same address repeatedly, an expanded signal is obtained as an output signal as shown in FIG. 6. Thus, in the circuit of the second embodiment, the two functions of compression and expansion can each be selected by one switch circuit.

In FIG. 4, the first constant value may be set arbitrarily from 0 to 1. Supposing the first constant value to be y, the horizontal expand rate of the input video signal may be given as 1/y. The second constant value may be set arbitrarily, and the expanding portion is determined by its value.

Figure 7:
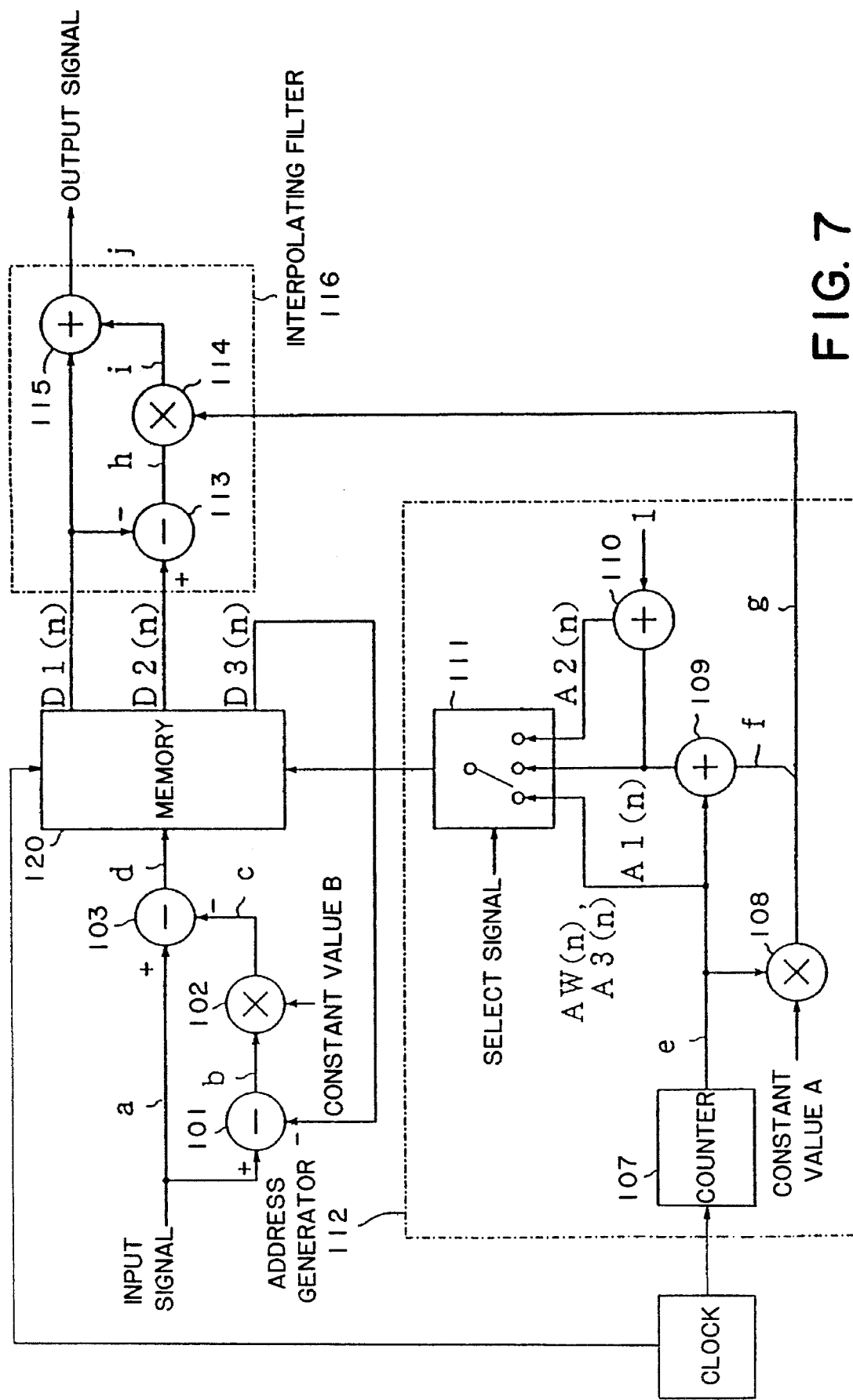
FIG. 7 is a circuit diagram of a third exemplary embodiment of the present invention.

FIG. 7 shows a third exemplary embodiment of the invention. A noise eliminating circuit is included in FIG. 7. In FIG. 7, a first subtractor 101 subtracts the signal stored in a memory 120 from a video input signal a. A third multiplier 102 multiplies an output signal b of the first subtractor 101 and a third constant value B. As the third constant B, a value corresponding to the noise elimination rate (0 to 1.0). is set, and this value is determined by the noise occurrence frequency or property. A second subtractor 103 subtracts an output signal c of the third multiplier 102 from the input signal a. An address generator 112 selects the address of memory 120, and controls signal writing and reading. The first and second subtractors 101 and 103, third multiplier 102, memory 120, and address generator 112 form a noise eliminator.

The address generator 112 comprises a counter 107, a first multiplier 108, first and third adders 109 and 110, and a selector 111. The counter 107 counts the number of horizontal sampling pulses of the video signal. The first multiplier 108 multiplies an output e of the counter 107 and the first constant value A. The first constant value A is the value for determining the conversion rate of video signal. A value of 0 indicates no conversion. As the value approaches 1, the conversion rate becomes higher. The first adder 109 adds the output e of the counter 107 and the integer part of the output signal of the first multiplier 108. The third adder 110 adds the output of the first adder 109 and the integer 1. The selector 111, supposing the output e of the counter 107 as the writing address AW(n) of the memory 120, and the output signals of the first and third adders 109, 110 to be reading addresses A1(n), A2(n) of the memory 120, selects their writing and reading addresses by time division. The selector 111 includes a changeover circuit, selects the writing and reading address by the select signal fed from outside, and controls the memory 120.

A third subtractor 113 subtracts a first output signal $D1(n)$ from a second output signal $D2(n)$ from the memory 120. The first output signal $D1(n)$ is the signal being read out from the memory 120 by the reading address $A1(n)$. The second output signal $D2(n)$ is the signal being read out from the memory 120 by the reading address $A2(n)$. A second multiplier 114 multiplies an output h of the third subtractor 113 and a decimal part g of the output signal of the first multiplier 108. A second adder 115 adds an output signal i of the second multiplier 114 and the first output signal $D1(n)$ to obtain an output signal. The third subtractor 113, second multiplier 114, and second adder 115 form an interpolating filter 116 of the video signal converting device.

The memory 120 is a line memory which holds the video input signal d, and stores one horizontal line of video signals for reading out the first to third output signals $D1(n)$ to $D3(n)$ by the address signals supplied from the selector 111. It is composed of, for example, a dual port memory. The output signal $D1(n)$ is a video signal being sampled supposing one line to be n, and it is read out from the memory 120 by the reading address $A1(n)$ without delay. The output signal $D2(n)$ is a video signal delayed from the output signal $D1(n)$ by one sampling point. The output signal $D3(n)$ is a signal delayed from the output signal d of the second subtractor 103 by one line. It is given to the subtraction input terminal of the first subtractor 101. The counter 107 gives the output e to the selector 111 as the writing address $AW(n)$ and reading address $A3(n)$.

Figure 8:
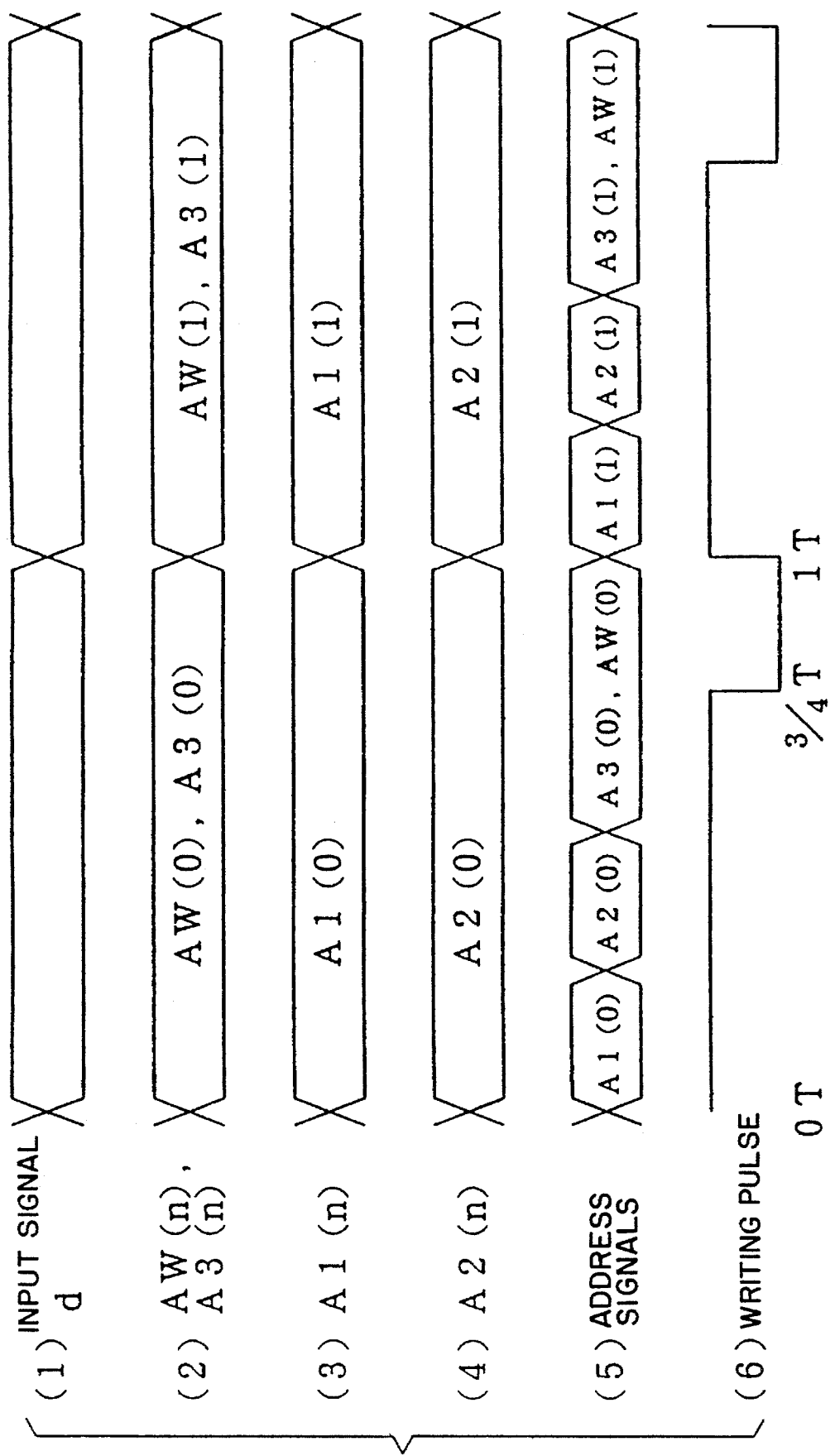
FIG. 8 is a timing chart for explaining the operation of an address generating circuit in FIG. 7.

The circuit in FIG. 7 operates as follows (see FIGS. 8, 9, 10, and 11). The first subtractor 101 subtracts the third output signal $D3(n)$ of one line before as being read out from the memory 120 from the video input signal a. At this time, the address generator 112 generates address signals as shown in FIG. 8 (2), FIG. 10 (1), and FIG. 11 (1) . Reading and writing are effected by the pulse shown in FIG. 8 (6). In FIG. 8(6), duration of 0T to (¾)T is the reading period, and (¾)T to 1T is the writing period. When a select signal is transmitted to the selector 111, the address signals shown in FIG. 8(2) to (4) are sequentially selected, and the address signals are given to the memory 120 in the sequence shown in FIG. 8(5) .

Figure 9:
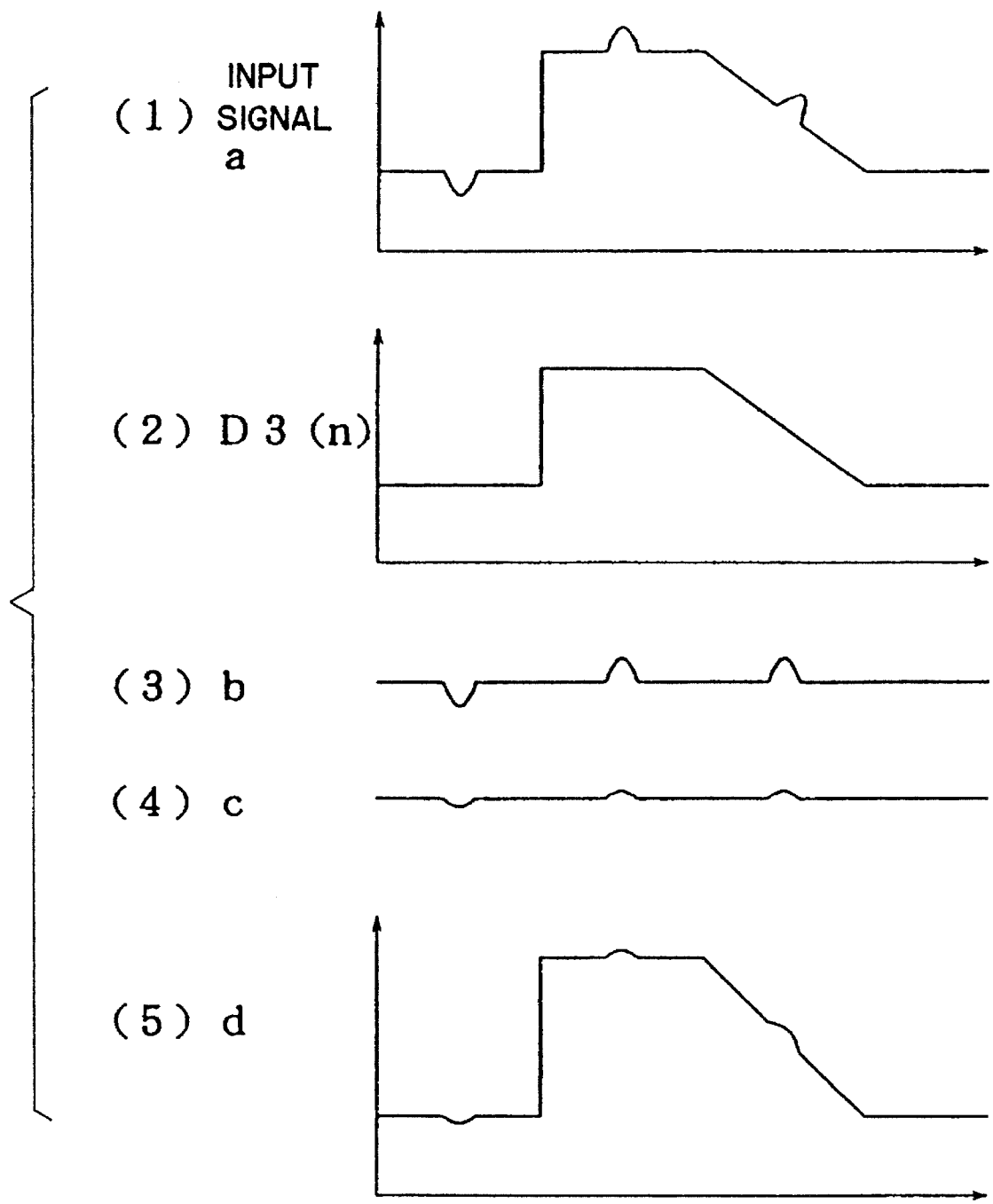
FIG. 9 is a waveform diagram for explaining the noise eliminating operation in FIG. 7.

When the signal a containing noise as shown in FIG. 9(1) is entered, the first subtractor 101 subtracts the signal $D3(n)$ (see FIG. 9(2)) of one line before being held in the memory 120 from the input signal a and extracts noise b as shown in FIG. 9(3). The third multiplier 102, supposing the third constant value B to be ½, produces an output c as shown in FIG. 9(4). The second subtractor 103 subtracts the output c of the third multiplier 102 from the input signal a, and generates a signal d as shown in FIG. 9(5). The address generator 112 generates an address signal, and writes the signal d into the memory 120 when the writing pulse is at low (L) level. This signal is read as output signal $D3(n)$ when the writing pulse is at high (H) level. Thus, a cyclic filter using the memory 120 is composed, so that the noise level included in the input signal can be lowered.

The integer part f and decimal part g of the output of the first multiplier 108 are applied to the first adder 109 and second multiplier 114. The first adder 109 adds the output e of the counter 107 and the integer part f, and generates a reading address $A1(n)$. The third adder 110 adds 1 to the reading address $A1(n)$ to generate a reading address $A2(n)$ . The selector 111 sequentially changes over the writing and reading addresses by the select signal, and produces an address signal shown in FIG. 8(5). When the reading addresses $A1(n)$, $A2(n)$ are given to the memory 120, output signals $D1(n)$ and $D2(n)$ are read out. The second subtractor 113 subtracts D1(n) from the output signal D2(n), and generates a signal h. The signal h is given to the second multiplier 114 to be multiplied by the decimal part g of the output of the first multiplier 108, and a signal i is generated. The second adder 115 adds the signal i to the first output signal D1(n), and generates horizontal compressed output signal J as shown in FIG. 10(10) and FIG. 11(10).

Figure 12A:
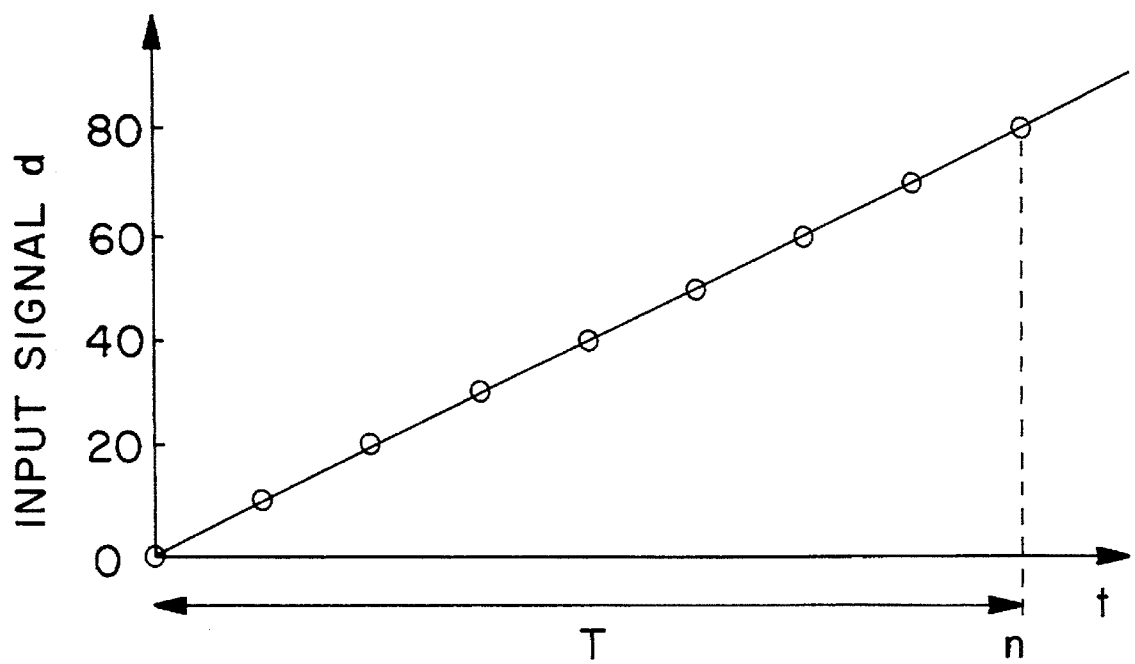
FIGS. 12(a) and (b) are graphs showing the relation between input signal and output signal in the embodiment in FIG. 7.
Figure 12B:
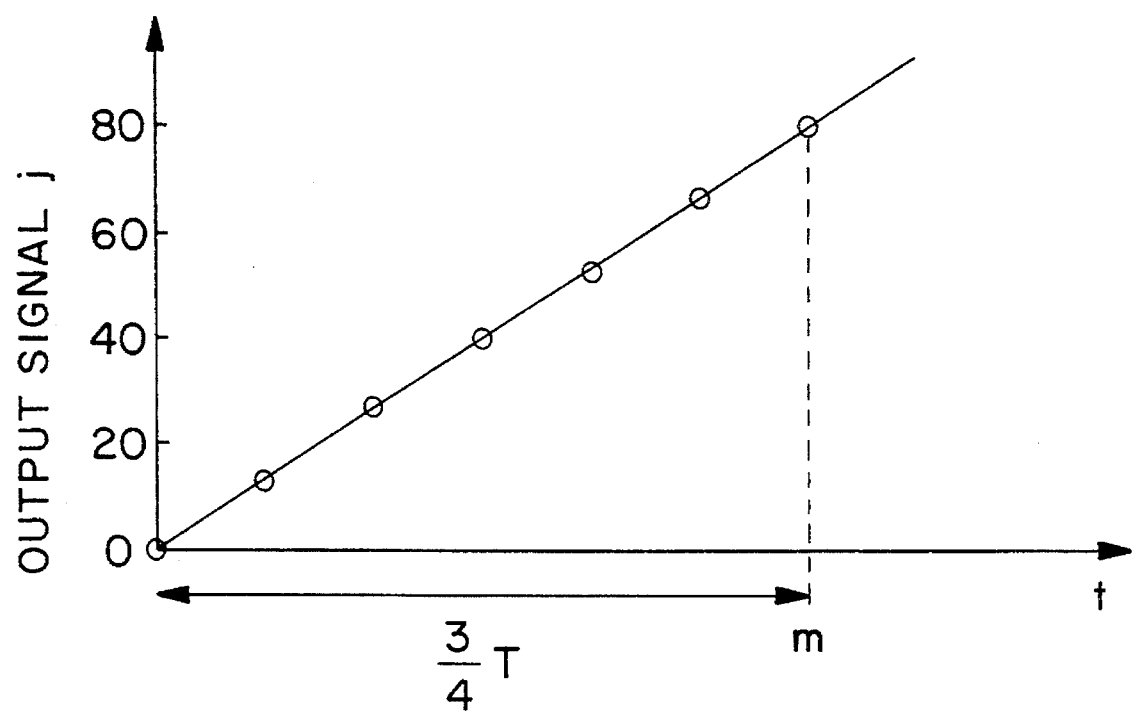

When the input signal d is a lamp signal as shown in FIG. 12(a) and the constant value is ⅓, the output signal J is a signal having the sampling point compressed to 0.75 as shown in FIG. 12(b), and the information at addresses 3, 7, 11, 15, . . . is eliminated as shown in FIG. 10 and FIG. 11(4) and (6). However, by the interpolating processing by the interpolating filter 116, the output signal J is linearly corrected as shown in FIG. 12(b).

The video signal compressing device of the invention obtains a noise eliminating effect suited to a video input signal by setting the constant value, and is capable of freely setting the length of the horizontal display of the video input signal. Therefore, an image of high quality is displayed in a display device differing in the aspect ratio.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A video signal converting device for receiving a video signal and for generating a modified video signal having a horizontal display length different from said received video signal, comprising:

a memory for storing video signal data corresponding to said video signal, means for reading out from said memory a first data value and a second data value of said stored video signal data by providing said memory with an address specified by both a conversion rate of said video signal and a clock of a predetermined frequency and for providing a coefficient used to interpolate said first data value and said second data value read out from said memory, and means for interpolating said first data value and said second data value by calculating said first data value, said second data value and said coefficient to obtain said modified video signal.

2. A video signal converting device comprising:

means for receiving a plurality of video signals, a memory for storing a plurality of video signal data values corresponding to said plurality of video signals, a counter for counting sampling pulses included in said plurality of video signals and for generating a counter output value, a first multiplier for multiplying a specific constant value and the counter output value to generate a multiplier result, a first adder for adding the counter output value and an integer part of the multiplier result to generate an address value for said memory, a subtractor for generating the difference between a first output value transmitted by said memory and a second output value transmitted by said memory, a second multiplier for multiplying the difference generated by the subtractor and the fractional part of the multiplier result to generate a farther multiplier result, a second adder for adding the further multiplier result and the first output value transmitted by the memory to produce modified video signals each having a horizontal display length different from a corresponding one of said received plurality of video signals, and display means for displaying a picture corresponding to said modified video signals.

3. A video signal converting device comprising:

means for receiving a plurality of video signals, a memory for storing a plurality of video signal data values corresponding to said plurality of video signals, a counter for counting sampling pulses included in said plurality of video signals and for generating a counter output value, a first multiplier for multiplying a first constant value and the counter value to generate a multiplier result, a switch for selecting one of the counter output value and a second constant value and for outputting a selected value, a first adder for adding, said selected value to the integer part of the output of the multiplier result, a subtractor for generating the difference between a first output value transmitted by said memory and a second output value transmitted by said memory, a second multiplier for multiplying the difference generated by the subtractor and the fractional part of the multiplier result to generate a further multiplier result, a second adder for adding the further multiplier result and the first output value transmitted by the memory to produce modified video signals each having a horizontal display length different from a corresponding one of said received plurality of video signals, and display means for displaying a picture corresponding to said modified video signals.

4. A video signal converting device for receiving a plurality of video signals and for generating a plurality of modified video signals each having a horizontal display length different from a corresponding one of said received plurality of video signals, comprising:

means for receiving said plurality of video signals, a memory for storing a plurality of video signal data values corresponding to said plurality of video signals, a first subtractor for subtracting one of said plurality of video signals, corresponding to one of said plurality of video signal data values stored in said memory from one of said received plurality of video signals and for generating a first subtractor output value, a third multiplier for multiplying the first subtractor output value and a third constant value and for generating a third multiplier output, a second subtractor for subtracting the third output multiplier from each one of the input video signals and for transmitting the result to the memory, a counter for counting sampling pulses included in said plurality of video signals and for generating a counter output value which is an address signal of the memory, a first multiplier for multiplying the counter output value and a first constant value and for generating a first multiplier output value, a first adder for adding the counter output value and an integer part of the first multiplier output value and for generating a first reading address value, a third adder for adding a constant value to the first reading address value and for generating a second reading address valued and a selector for selecting and applying one of said first reading address value, said second reading address value and said counter output value to the memory to read out at least one of said plurality of video signal data values from said memory.

5. A video signal converting device comprising:

means for receiving a plurality of video signals, a memory for storing a plurality of video signal data values corresponding to said plurality of video signals, a counter for counting pulses included in said plurality of video signals and for generating a memory address value, a first multiplier for multiplying the memory address value and a first constant value to generate a multiple result, a first adder for adding the memory address value and an integer part of the multiplier result to generate a first address value, a third adder for adding a second constant value to the first address value to generate a second address value, a selector for selecting and applying one of said memory address value, said first address value and said second address value to said memory to read out at least one of said plurality of video signal data values from said memory, a subtractor for generating the difference between a first output value transmitted by said memory and a second output value transmitted by said memory, a second multiplier for multiplying the difference generated by the subtractor and the decimal part of the multiplier result and for generating a further multiplier result, a second adder for adding the further multiplier to the first output value of the memory to produce modified video signal having a horizontal display length different from a corresponding one of said input video signal, and display means for displaying a picture corresponding to said modified video signal.

6. A video signal converting device including a noise eliminating function comprising:

means for receiving a plurality of video signals, a memory for storing a plurality of video signal data values corresponding to said plurality of input video signals, a first subtractor for subtracting one of said plurality of video signals, corresponding to one of said plurality of video signal data values stored in said memory from one of said received plurality of video signals and for generating a first subtractor output value, a third multiplier for multiplying the first subtractor output value and a third constant value and for generating a third multiplier output, a second subtractor for subtracting the third output multiplier from each one of the input video signals and for transmitting the result to the memory, a counter for counting sampling pulses included in said plurality of video signals and for generating a counter output value which is an address signal of the memory, a first multiplier for multiplying the counter output value and a first constant value and for generating a first multiplier output value, a first adder for adding the counter output value and an integer part of the first multiplier output value and for generating a first reading address value, a third adder for adding a constant value to the first reading address value and for generating a second reading address value, and a selector for selecting and applying one of said first reading address value, said second reading address value and said counter output value to the memory, a third subtractor for generating the difference between two video signal data values transmitted by the memory responsive to the memory receiving the first and second reading address, a second multiplier for multiplying the third subtractor output value and the functional part of the output of the first multiplier output value, and for generating a second multiplier output value, a second adder for adding the second multiplier output value to a first one of the two video signal data values transmitted by the memory to produce a modified video signal having a horizontal display length different from a corresponding one of said received plurality of video signals, and display means for displaying a picture corresponding to said modified video signal.

* * * * *

UNITED STATES PATENT AND TRADEMARK OFFICE
CERTIFICATE OF CORRECTION

PATENT NO.    : 5,459,525
DATED         : October 17, 1995
INVENTOR(S)   : Yosuke Izawa et al.

It is certified that error appears in the above-identified patent and that said Letters Patent is hereby corrected as shown below:

Column 7, line 4, claim 4, after "address" change "valued" into --value,--.

Signed and Sealed this

Eleventh Day of June, 1996

BRUCE LEHMAN

Attest:

Attesting Officer        Commissioner of Patents and Trademarks